Figure 1:
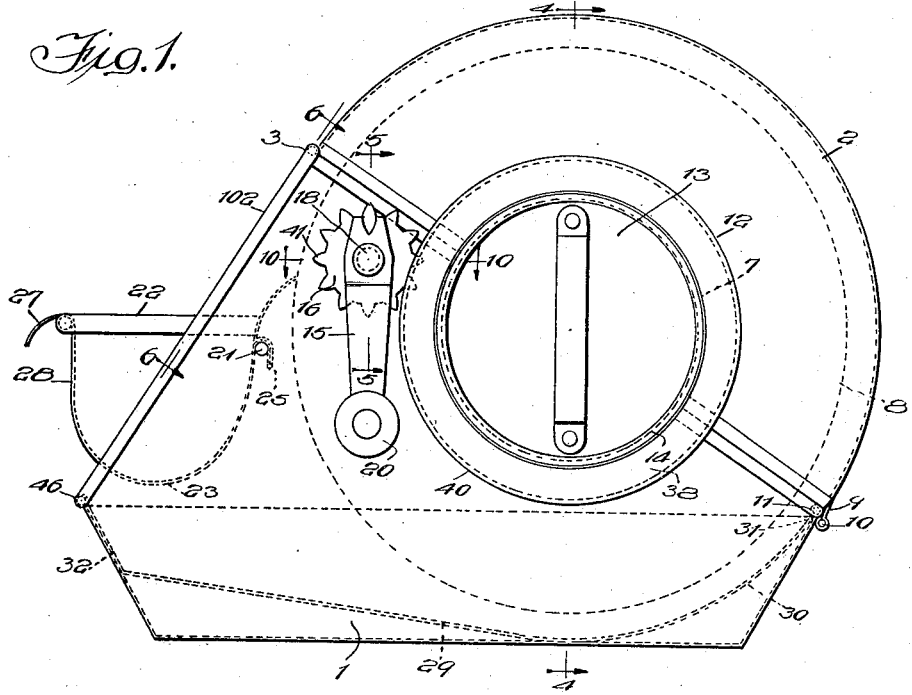

April 29, 1930.  B. D. GILSON  1,756,683
ICE CREAM FREEZER
Filed May 12, 1928  3 Sheets-Sheet 2
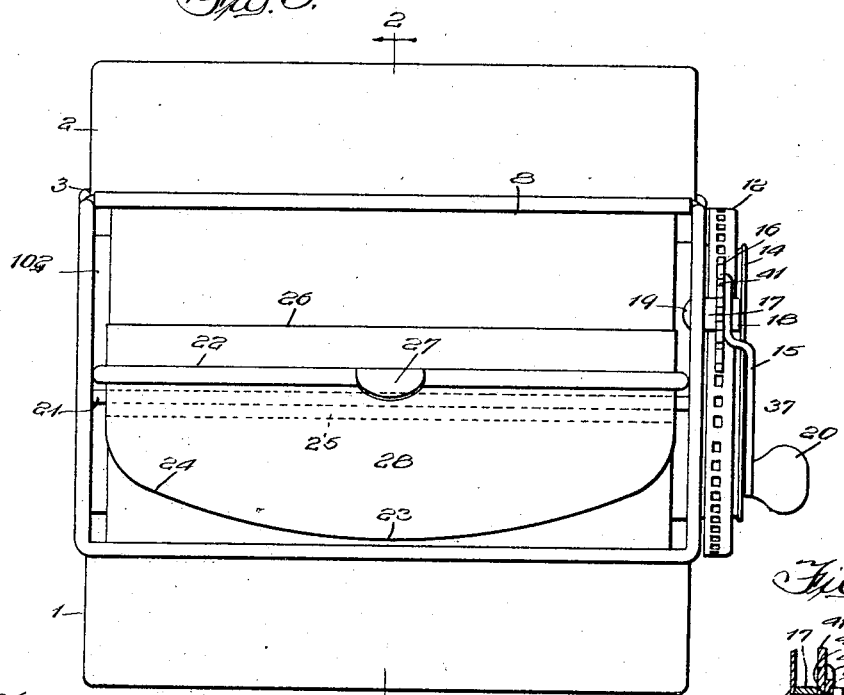
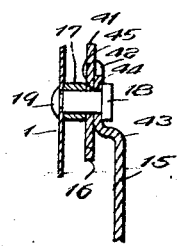
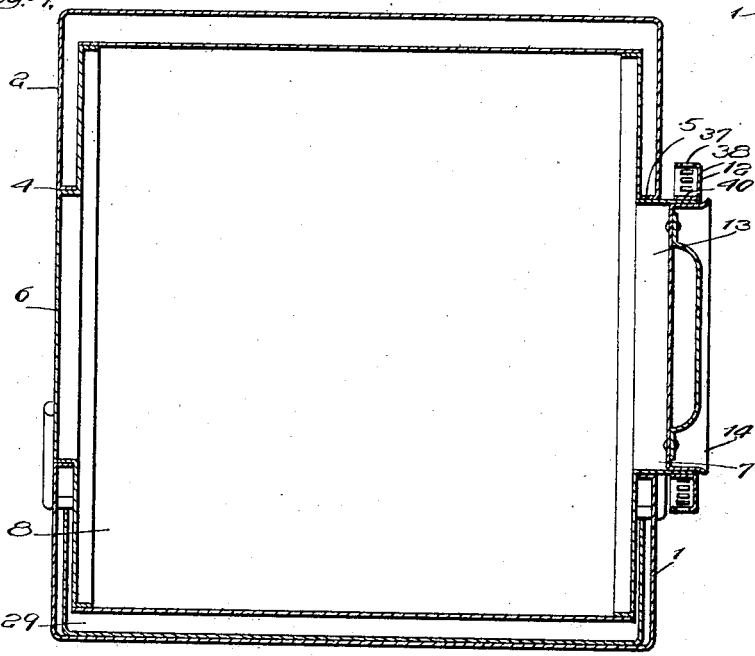
Witness:
William P. Kilroy
Inventor:
Bert D. Gilson
By George E. Billett Atty.

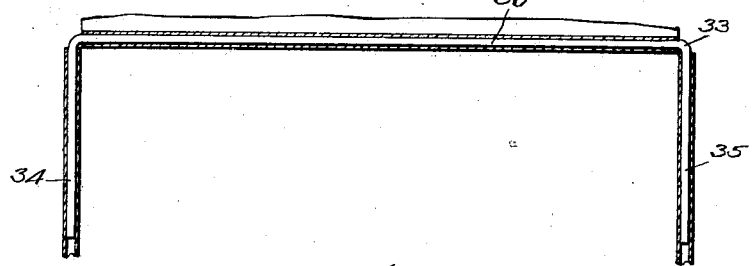
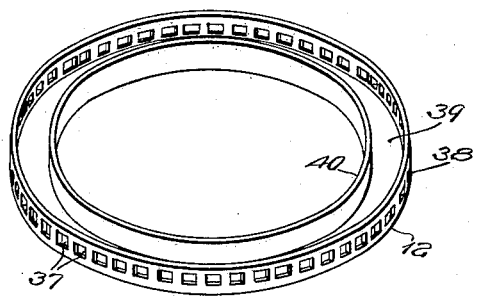
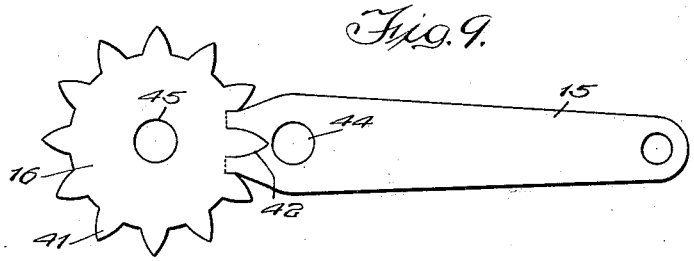
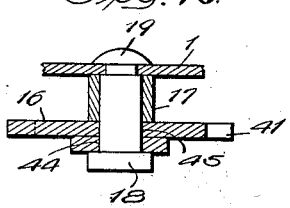

Patented Apr. 29, 1930

1,756,683

UNITED STATES PATENT OFFICE

BERT DELL GILSON, OF CHICAGO, ILLINOIS, ASSIGNOR OF ONE-HALF TO SAMUEL J. ROSENTHAL, OF CHICAGO, ILLINOIS

ICE-CREAM FREEZER

Application filed May 12, 1928. Serial No. 277,295.

This invention pertains to the general class of ice cream freezers and particularly to the class of freezers known as external freezers, in which the refrigerant is placed within a revolving holder.

An object of applicant's invention is the production of a device of this character that is simple in construction, of a small number of parts, that is easily operated, of a low cost of manufacture, efficient in operation, durable, adapted for instant use, of relatively light weight, economical in the use of refrigerant and substance to be frozen, that is readily adaptable for household or any other use, that is of a pleasing and attractive appearance, and that is highly satisfactory for its intended purpose. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

Figure 2:
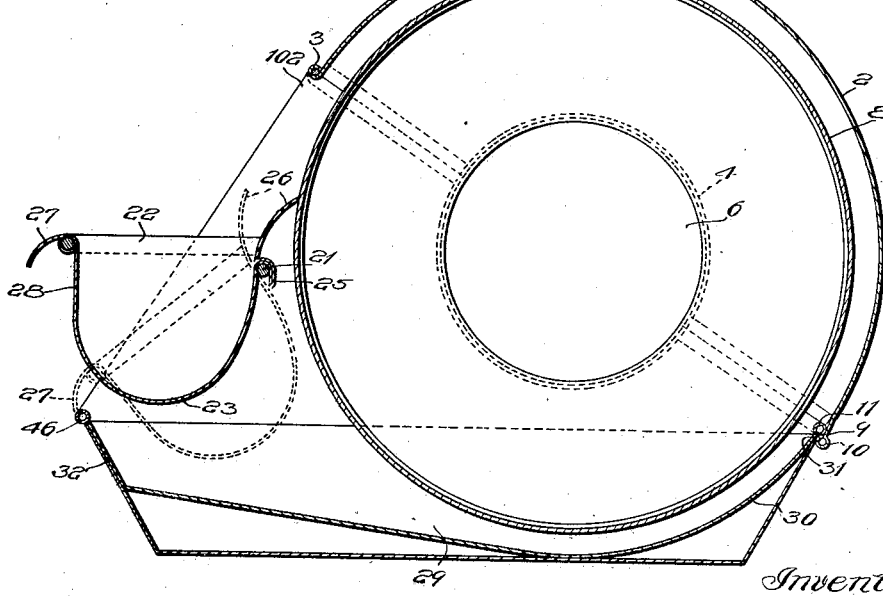

In the drawings, wherein like reference characters indicate like or corresponding parts:

Fig. 1 is an elevation of the device;
Fig. 2 is a section on line 2—2 of Fig. 3;
Fig. 3 is an end view;
Fig. 4 is a section on line 4—4 of Fig. 1;
Fig. 5 is a section on line 5—5 of Fig. 1;
Fig. 6 is a section on line 6—6 of Fig. 1;
Fig. 7 is a lay-out of the ring gear;
Fig. 8 is a perspective view of the ring gear in its final form;
Fig. 9 is a lay-out of the operating handle and the gear integral therewith; and
Fig. 10 is a section on line 10—10 of Fig. 1.

Referring to the drawings in which a preferred embodiment of the invention is shown, in Fig. 1 is shown the freezer with a lower casing 1 having an opening 102 at one end and an upper casing 2, the latter hinged to the casing 1 at 3. The particular construction of the hinge will be hereinafter set forth. The casings at their meeting edges on opposite sides are each formed with semi-circular inwardly extending portions 4 and 5, see Fig. 4, thus forming bearings for the ends 6 and 7 of the revolving hollow cylinder 8. The meeting edges of the casings 1 and 2 may be of either rolled or flat construction. The casing 2 on the side opposite from the hinge 3 is formed with an extension 9 shown with the rolled end at 10 which overlaps the edge 11 of the casing 1 also shown rolled. A novel and efficient catch is thus formed for securing the casings 1 and 2 together and thus retaining the cylinder 8 in place in its bearings 4 and 5 formed by the casings 1 and 2.

The end 7 of the cylinder 8 is extended from the side of the freezer and has attached thereto the ring gear 12 which is preferably pressed or stamped out of sheet metal, the particular formation of which will be hereinafter set forth. The aperture 13 in the end 7 is closed by a closure member 14 which preferably is retained in place by a wedging action or friction, or both.

Pivoted to the side of the freezer and particularly to the casing 1 thereof is the operating handle 15, preferably formed integral with gear 16 which operatively engages the ring gear 12. The particular formation and structure of the handle 15 and the gear 16 will be hereinafter set forth. The manner of attaching the gear 16 and handle 15 to the casing 1 is illustrated in Fig. 5, wherein a spacing member 17 is placed between the gear 16 and the casing 1, and a flanged pin 18 passed through the handle 15, the gear 16, and the tubular spacing member 17, the pin 18 having its end overturned within the casing 1 as illustrated at 19. This particular construction is preferred. However, it is understood that other means of attaching the handle 15 and gear 16 may be provided if desired. The handle 15 is preferably provided with a knob 20 for engagement by the operator.

It is of course understood that this gearing may be enclosed within the casing if so desired. The change in structure will be obvious to persons skilled in the art in view of this disclosure.

Extending transversely of the casing 1 and within the opening 102 thereof is a rod 21 which supports one side of the collecting pan 100

22. The collecting pan 22 is formed arcuate in cross section as shown at 23 in Fig. 2 and is also curved longitudinally along its bottom portion as shown at 24 in Fig. 3. The collecting pan 22 is formed with a fold shown at 25 which is made more or less in the shape of a hook and fits over the rod 21 to support the inner side of the pan. The pan 22 is also formed with an extension 26 preferably arcuate in shape which contacts the periphery of the cylinder 8, thus removing and collecting frozen substance adhering thereto. At approximately the center of the outer upper edge of the pan 22 a portion 27 forming a handle is extended therefrom and preferably formed integrally with the pan 22. The handle 27, however, may be pressed out from the side 28 of the pan 22 if desired.

In the bottom of the casing 1 is disposed a pan 29 having an arcuate portion 30 at one end thereof. The extreme end of the pan 29 abuts the portion 11 of the casing 1 as shown at 31. The other end of the pan fits within the casing 1 and rests against the sloping wall thereof as shown at 32. By means of this novel construction, the pan 29 is not only securely held in operative position but same may be withdrawn from the freezer readily and without spilling the contents of the pan. Furthermore, the substance to be frozen is disposed in a thin layer about the cylinder 8 and is thus readily brought to a freezing temperature, such that particles of same are readily frozen and adhere to the periphery of the freezing cylinder.

The hinge structure is shown in Fig. 6, wherein a U-shaped rod 33 having legs 34 and 35 and a connecting portion 36 is disposed within the edges of the casings 1 and 2. The legs 34 and 35 are disposed within opposite edges of the casing 1, whereas the connecting portion 36 is disposed within the edge of the casing 2. The construction of the portions of casings 1 and 2 enclosing the U-shaped member 33 is shown rolled. However, it is obvious that same may be of flat construction if desired.

The lay-out of the ring gear 12 is shown in Fig. 7. The apertures 37 are formed along one edge 38 of the strip. The edge 38 becomes the outer peripheral surface of the ring gear. The center portion 39 becomes the outer side wall of the formed gear and the edge 40 becomes the inner portion of the gear which engages the extension on the cylinder 8. The apertures 37 may be of any desired shape, but are preferably oblong and are engaged by the teeth on the gear 16.

The gear 16 and the handle 15 are preferably stamped from one piece of sheet metal, the lay-out of which is shown in Fig. 9. The teeth 41 are preferably formed as shown, one tooth shown at 42 being stamped out of the handle portion. The handle 15 is then bent over the face of the gear as shown in Fig. 5 and is preferably formed with an offset portion 43. An aperture 44 is formed in the handle 15 which is positioned such that same will be aligned with the aperture 45 in the gear 16 and attachment of the handle 15 and gear 16 to the casing 1 is effected by means of the pin 18 and the tubular spacing member 17.

It will be particularly noted that all of the parts herein described and shown are particularly adapted to be made from stampings.

The operation of the device is as follows: A suitable refrigerant is placed within the cylinder 8 by means of removing the closure member 14. The cylinder 8 may be removed from the casings 1 and 2 for this purpose, if desired, by means of disengaging the latch formed at 10 and 11 and swinging the casing 2 about the hinge formed at 3. The cylinder 8 may also be thus removed for cleaning purposes. The inside of the casings 1 and 2 are also thus effectively exposed for cleaning. After the refrigerant is placed within the cylinder 8 and same replaced within the casings 1 and 2, the substance to be frozen, which may be of any suitable kind or for any purpose is placed within the pan 29. The collecting pan 22 may be readily unhooked from the rod 21 in order to make filling of the pan 29 more easily accomplished. If the pan 22 is removed, same is now replaced and the crank or handle 15 is turned. As the substance freezes and adheres to the cylinder 8, same is scraped off by means of the projection 26 and the frozen particles collect in the bottom of the pan 22. The novel shape of the pan 22 particularly adapts same for easy, efficient and ready collection of the contents thereof by the usual moulds used for this purpose, such for instance as those used for ice cream, etc. If it be desired at any time to remove the pan 29, same is readily effected without spilling the contents thereof in view of the arcuate portion 30 which passes easily about the cylinder 8. In other words, the pan 29 may be passed into and out of the casing 1 beneath the cylinder 8 without removal of the cylinder 8 or spilling of the contents of the pan 29.

When the pan 22 is not held in the position shown in full lines in Fig. 2, same may drop to the position shown in dotted lines, wherein the projection or handle 27 engages the edge 46 of casing 1. The pan is thus held away from the cylinder 8 and if desired the cylinder may be turned until a thick coating of frozen substance has collected thereon. This latter procedure may be found preferable in the freezing of certain substances or the operator may desire to use the device in this manner in freezing all substances. If desired, and particularly when the machine is to be left in an inoperative position with frozen substance in the pan 22, the handle portion 27 may be pressed slightly inward and moved downward within the casing 1 whereupon the pan 22 comes in contact with the cylinder 8 and is kept at or near a freezing temperature thereby.

It will be noted that the particular shape of the device adapts same for easy operation, and provides same with a pleasing and attractive appearance. It is thus seen that a novel device has been provided highly satisfactory for its intended purpose.

Having thus described my invention, it is obvious that various immaterial modifications may be made in the same without departing from the spirit of my invention; hen; hence I do not wish to be understood as limiting myself to the exact form, construction, arrangement and combination of parts herein shown and described, or uses mentioned.

What I claim as new and desire to secure by Letters Patent is:

1. In a device of the kind described a lower casing having an opening at one end, an upper casing disposed above and hingedly connected to said lower casing and forming therewith a hollow enclosure, a hollow cylinder adapted to hold a refrigerant disposed within said casings and journaled in bearings formed in abutting edges of said casings, a catch formed by overlapping edges of said casings to hold said casings and said cylinder in operative position, a tubular projection on a journaled portion of said cylinder, a removable closure member for said projection, a ring gear attached to said projection, a second gear rotatably mounted on one of said casings, a handle on said second gear, a collecting pan pivotally mounted in said opening of said lower casing, said pan having an extension for contacting said cylinder to scrape particles therefrom, the bottom of said pan curved transversely and longitudinally, and a pan adapted to be removably positioned in the bottom of said lower casing, said pan having an arcuate portion for passing about said cylinder, and means co-operating with said pan to hold said pan in position.

2. In a device of the kind described an enclosure, means within said enclosure including a revolving cylinder for freezing substances, an opening in one end of said enclosure, a collecting pan disposed within said opening and having an extension adapted to contact said cylinder to scrape substances therefrom, said pan having a bottom curved both longitudinally and transversely, a pan for holding substances to be frozen, said last mentioned pan disposed in the bottom of said casing and surrounding a portion of said cylinder, and means formed on said collecting pan and cooperable with said enclosure for positioning the collecting pan in spaced relation with respect to said cylinder.

3. In a device of the kind described a lower casing portion, an upper casing portion cooperating with said lower casing portion to form an enclosure, means for pivotally connecting said casings together said means comprising a U shaped rod, the legs of said rod enclosed by edge portions of one of said casings and the portion of said rod connecting said legs enclosed by an edge portion of the other casing.

4. In a device of the kind described an enclosure, a hollow cylinder rotatably mounted in said enclosure and having relatively large journaled portions, one of said journaled portions projecting from the side of said enclosure, means for rotating said cylinder, said means including a ring gear attached to said projecting portion, said ring gear being formed of sheet metal and of substantially U shaped cross-section, one leg of said U forming the outer peripheral surface of said ring gear and having a series of apertures thereby leaving a series of narrow strips of metal between said apertures, said strips corresponding to gear teeth, the other leg of said U forming the innermost wall of said ring gear and adapted to engage said projecting journaled portion to secure said ring gear thereto.

5. In a device of the class described having an enclosure, and a rotatable cylinder in said enclosure, means for rotating said cylinder, said means including a gear and a handle integral with said gear, said gear and handle stamped from sheet metal, apertures in said gear and said handle, said handle portion bent over the face of said gear to align said apertures, and means for pivoting said gear and handle to said enclosure, said means comprising a flanged pin and a tubular spacing member, said pin passing through said apertures, said spacing member, and the wall of said enclosure.

6. In a device of the kind described having an enclosure and a cylinder having an open end portion rotatably mounted in said enclosure, means for scraping frozen substances from the periphery of said cylinder and collecting same, said means comprising a collecting pan having a bottom formed arcuately both transversely and longitudinally, a projecting edge on said pan said edge adapted to contact said cylinder, an outwardly and downwardly projecting fold in the side wall of said pan, said fold adapted to engage a rod to pivotally support said pan, and reduction gearing operatively related to the open end portion of said cylinder for rotating the cylinder.

In testimony whereof, I have hereunto signed my name.

BERT DELL GILSON.